(12) United States Patent  (10) Patent No.: US 8,689,154 B2
Rashed et al.  (45) Date of Patent: Apr. 1, 2014

(54) PROVIDING TIMING-CLOSED FINFET DESIGNS FROM PLANAR DESIGNS

(75) Inventors: Mahbub Rashed, Santa Clara, CA (US); David Doman, Austin, TX (US); Dinesh Somasekhar, Portland, OR (US); Yan Wang, San Jose, CA (US); Yunfei Deng, Sunnyvale, CA (US); Navneet Jain, Milpitas, CA (US); Jongwook Kye, Pleasanton, CA (US); Ali Keshavarzi, Cupertino, CA (US); Subramani Kengeri, San Jose, CA (US); Suresh Venkatesan, Danbury, CT (US)

(73) Assignee: GlobalFoundries Inc., Grand Cayman (KY)

( * ) Notice: Subject to any disclaimer, the term of this patent is extended or adjusted under 35 U.S.C. 154(b) by 0 days.

(21) Appl. No.: 13/446,418

(22) Filed: Apr. 13, 2012

(65) Prior Publication Data

US 2013/0275935 A1    Oct. 17, 2013

(51) Int. Cl.
 *G06F 17/50*    (2006.01)
(52) U.S. Cl.
 USPC ........... 716/103; 716/100; 716/101; 716/106; 716/108; 716/132; 716/134
(58) Field of Classification Search
 USPC .......... 716/100, 101, 103, 106, 108, 132, 134
 See application file for complete search history.

(56) References Cited

U.S. PATENT DOCUMENTS

| | | | | |
|---|---|---|---|---|
| 7,013,447 | B2 * | 3/2006 | Mathew et al. ................. | 716/55 |
| 7,739,642 | B2 * | 6/2010 | Albrecht ....................... | 716/113 |
| 8,286,114 | B2 * | 10/2012 | Chuang et al. ................ | 716/119 |
| 2004/0133860 | A1 * | 7/2004 | Hieter et al. ..................... | 716/2 |
| 2008/0263492 | A1 * | 10/2008 | Chuang et al. .................. | 716/10 |
| 2008/0276208 | A1 * | 11/2008 | Albrecht et al. .................. | 716/6 |
| 2009/0280582 | A1 * | 11/2009 | Thijs et al. ....................... | 438/14 |
| 2010/0262939 | A1 * | 10/2010 | Zahn et al. ........................ | 716/2 |
| 2010/0287518 | A1 * | 11/2010 | Becker .............................. | 716/9 |
| 2010/0299645 | A1 * | 11/2010 | Sakurai et al. .................... | 716/6 |
| 2011/0154280 | A1 * | 6/2011 | Agarwal et al. ............... | 716/106 |
| 2011/0191733 | A1 * | 8/2011 | Nagaraj et al. ................ | 716/108 |
| 2011/0282478 | A1 * | 11/2011 | Shen et al. ..................... | 700/104 |
| 2011/0283245 | A1 * | 11/2011 | Shen et al. ..................... | 716/106 |

(Continued)

OTHER PUBLICATIONS

Edwards, Chris, "Intel Takes considered route to FinFET", Feb. 20, 2012, internet blog post retrieved at http://www.techdesignformums.com/blog/2012/02/20/intel-finfet-design-isscc/. pp. 1-2.*

(Continued)

*Primary Examiner* — Stacy Whitmore

(74) *Attorney, Agent, or Firm* — Ditthavong Mori & Steiner, P.C.

(57) ABSTRACT

An approach for providing timing-closed FinFET designs from planar designs is disclosed. Embodiments include: receiving one or more planar cells associated with a planar design; generating an initial FinFET design corresponding to the planar design based on the planar cells and a FinFET model; and processing the initial FinFET design to provide a timing-closed FinFET design. Other embodiments include: determining a race condition associated with a path of the initial FinFET design based on a timing analysis of the initial FinFET design; and increasing delay associated with the path to resolve hold violations associated with the race condition, wherein the processing of the initial FinFET design is based on the delay increase.

19 Claims, 7 Drawing Sheets

(56) References Cited

U.S. PATENT DOCUMENTS

2012/0124528 A1* 5/2012 Wang et al. ............... 716/52
2012/0278776 A1* 11/2012 Lei et al. ............... 716/111
2012/0278777 A1* 11/2012 Lin et al. ............... 716/111
2012/0284679 A1* 11/2012 Tetelbaum ............... 716/113
2013/0026571 A1* 1/2013 Kawa et al. ............... 257/347
2013/0026572 A1* 1/2013 Kawa et al. ............... 257/347
2013/0043923 A1* 2/2013 Gasper et al. ............... 327/281
2013/0069703 A1* 3/2013 Gasper et al. ............... 327/264

OTHER PUBLICATIONS

Wilsin, Gosti et al., "Addressing Timing closure problem by integrating logic optimization and placement", 2001. IEEE, pp. 224-231.*

* cited by examiner

PROVIDING TIMING-CLOSED FINFET DESIGNS FROM PLANAR DESIGNS

TECHNICAL FIELD

The present disclosure relates to fin-based field-effect transistor (FinFET) designs. The present disclosure is particularly applicable to FinFET designs in 20 nanometer (nm) technology nodes and beyond.

BACKGROUND

FinFET is a recent technology pioneered for 20 nm technology nodes and beyond. Compared with traditional designs, FinFET designs can offer much greater performance with significantly lower leakage. However, the FinFET design process is typically complex, and mask and other development costs associated with advanced technology nodes are astronomical.

A need therefore exists for cheaper timing-closed FinFET designs, and enabling methodology, such as providing timing-closed FinFET designs from planar designs.

SUMMARY

An aspect of the present disclosure is a method for implementing a timing-closed FinFET design from a planar design.

Another aspect of the present disclosure is an apparatus for implementing a timing-closed FinFET design from a planar design.

Additional aspects and other features of the present disclosure will be set forth in the description which follows and in part will be apparent to those having ordinary skill in the art upon examination of the following or may be learned from the practice of the present disclosure. The advantages of the present disclosure may be realized and obtained as particularly pointed out in the appended claims.

According to the present disclosure, some technical effects may be achieved in part by a method including: receiving one or more planar cells associated with a planar design; generating an initial FinFET design corresponding to the planar design based on the planar cells and a FinFET model; and processing the initial FinFET design to provide a timing-closed FinFET design.

Aspects of the present disclosure include: determining a race condition associated with a path of the initial FinFET design based on a timing analysis of the initial FinFET design; and increasing delay associated with the path to resolve hold violations associated with the race condition, wherein the processing of the initial FinFET design is based on the delay increase. Additional aspects include replacing a FinFET cell in the path with a corresponding FinFET cell slower than the FinFET cell, wherein the delay increase is based on the replacement. Further aspects include removing a fin of a FinFET cell in the path, wherein the delay increase is based on the removal of the fin. Moreover, some aspects include the path being a clock path, a data path, or a combination thereof. Other aspects include the planar design being a timing-closed planar design.

Certain aspects include the FinFET cell being a mother cell, the corresponding FinFET cell being a daughter cell of the mother cell, wherein the daughter cell has fewer fins than the mother cell. Another aspect includes generating the mother cell, the daughter cell, or a combination thereof based on the planar cells and the FinFET model. Various aspects include generating the daughter cell based on a high frequency of use associated with the mother cell. Other aspects include generating a plurality of daughter cells corresponding to the mother cell, wherein each of the plurality of daughter cells is associated with a different number of fins, and the daughter cell is selected from the plurality of daughter cells.

Further aspects of the present disclosure include: generating a fin-based grid associated with the FinFET model; overlapping the fin-based grid and the planar cells; and removing fins of the fin-based grid that do not overlap a diffusion region of the planar cells, wherein the generation of the initial FinFET design is based on the removal of the fins. Some aspects include providing remaining fins of the fin-based grid as active fins for the initial FinFET design, wherein the generation of the initial FinFET design is further based on the remaining fins.

An additional aspect of the present disclosure is an apparatus including a processor, and a memory including computer program code for one or more computer programs, the memory and the computer program code configured to, with the processor, cause the apparatus to: receive one or more planar cells associated with a planar design; generate an initial FinFET design corresponding to the planar design based on the planar cells and a FinFET model; and process the initial FinFET design to provide a timing-closed FinFET design.

Aspects include the apparatus being further caused to: determine a race condition associated with a path of the initial FinFET design based on a timing analysis of the initial FinFET design; and increase delay associated with the path to resolve hold violations associated with the race condition by replacing a FinFET cell in the path with a corresponding FinFET cell slower than the FinFET cell, removing a fin of the FinFET cell in the path, or a combination thereof, wherein the processing of the initial FinFET design is based on the delay increase, the FinFET cell is a mother cell, the corresponding FinFET cell is a daughter cell of the mother cell, and the daughter cell has fewer fins than the mother cell. Some aspects include the path being a clock path, a data path, or a combination thereof. Other aspects include the planar design being a timing-closed planar design.

Certain aspects include the apparatus being further caused to: generate the mother cell based on the planar cells and the FinFET model; and generate the daughter cell based on the planar cells, the FinFET model, and a high frequency of use associated with the mother cell. Various aspects include the apparatus being further caused to: generate a plurality of daughter cells corresponding with the mother cell, wherein each of the plurality of daughter cells is associated with a different number of fins, and the daughter cell is selected from the plurality of daughter cells. Further aspects include the apparatus being further caused to: generate a fin-based grid associated with the FinFET model; overlap the fin-based grid and the planar cells; remove fins of the fin-based grid that do not overlap a diffusion region of the planar cells; and provide remaining fins of the fin-based grid as active fins for the initial FinFET design, wherein the generation of the initial FinFET design is further based on the remaining fins.

Another aspect of the present disclosure includes: receiving one or more planar cells associated with a planar design; generating an initial FinFET design corresponding to the planar design based on the planar cells and a FinFET model; determining a race condition associated with a path of the initial FinFET design based on a timing analysis of the initial FinFET design; increasing delay associated with the path to resolve hold violations associated with the race condition by replacing a FinFET cell in the path with a corresponding FinFET cell slower than the FinFET cell; and providing a timing-closed FinFET design based on the delay increase, wherein the FinFET cell is a mother cell, the corresponding FinFET cell is a daughter cell of the mother cell, and the daughter cell has fewer fins than the mother cell.

Additional aspects include: generating a plurality of daughter cells corresponding with the mother cell based on a high frequency of use associated with the mother cell, wherein each of the plurality of daughter cells is associated with a different number of fins, and the daughter cell is selected from the plurality of daughter cells. Further aspects include: generating a fin-based grid associated with the FinFET model; overlapping the fin-based grid and the planar cells; removing fins of the fin-based grid that do not overlap a diffusion region of the planar cells; and providing remaining fins of the fin-based grid as active fins for the initial FinFET design, wherein the generation of the initial FinFET design is further based on the remaining fins.

Additional aspects and technical effects of the present disclosure will become readily apparent to those skilled in the art from the following detailed description wherein embodiments of the present disclosure are described simply by way of illustration of the best mode contemplated to carry out the present disclosure. As will be realized, the present disclosure is capable of other and different embodiments, and its several details are capable of modifications in various obvious respects, all without departing from the present disclosure. Accordingly, the drawings and description are to be regarded as illustrative in nature, and not as restrictive.

BRIEF DESCRIPTION OF THE DRAWINGS

The present disclosure is illustrated by way of example, and not by way of limitation, in the figures of the accompanying drawing and in which like reference numerals refer to similar elements and in which.

DETAILED DESCRIPTION

In the following description, for the purposes of explanation, numerous specific details are set forth in order to provide a thorough understanding of exemplary embodiments. It should be apparent, however, that exemplary embodiments may be practiced without these specific details or with an equivalent arrangement. In other instances, well-known structures and devices are shown in block diagram form in order to avoid unnecessarily obscuring exemplary embodiments. In addition, unless otherwise indicated, all numbers expressing quantities, ratios, and numerical properties of ingredients, reaction conditions, and so forth used in the specification and claims are to be understood as being modified in all instances by the term "about."

The present disclosure addresses and solves problems of design complexities and costs associated with FinFET design. The present disclosure addresses and solves such problems, for instance, by, inter alia, providing a simple, low-cost migration flow from a planar design to a timing-closed FinFET design.

Figure 1:
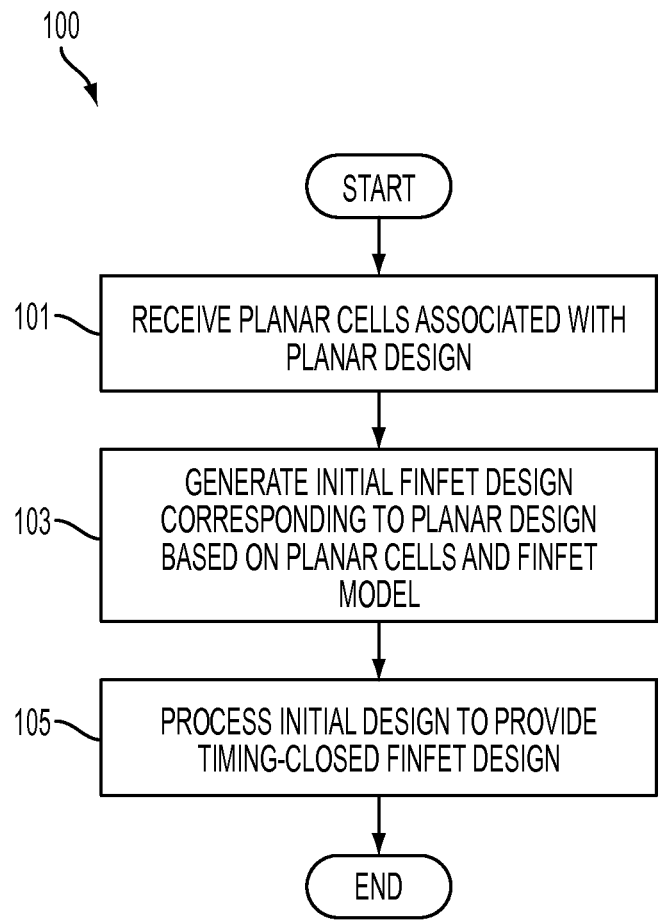
FIG. 1 is a flowchart of a process for providing timing-closed FinFET designs from planar designs, in accordance with an exemplary embodiment of the present disclosure.
Figure 6:
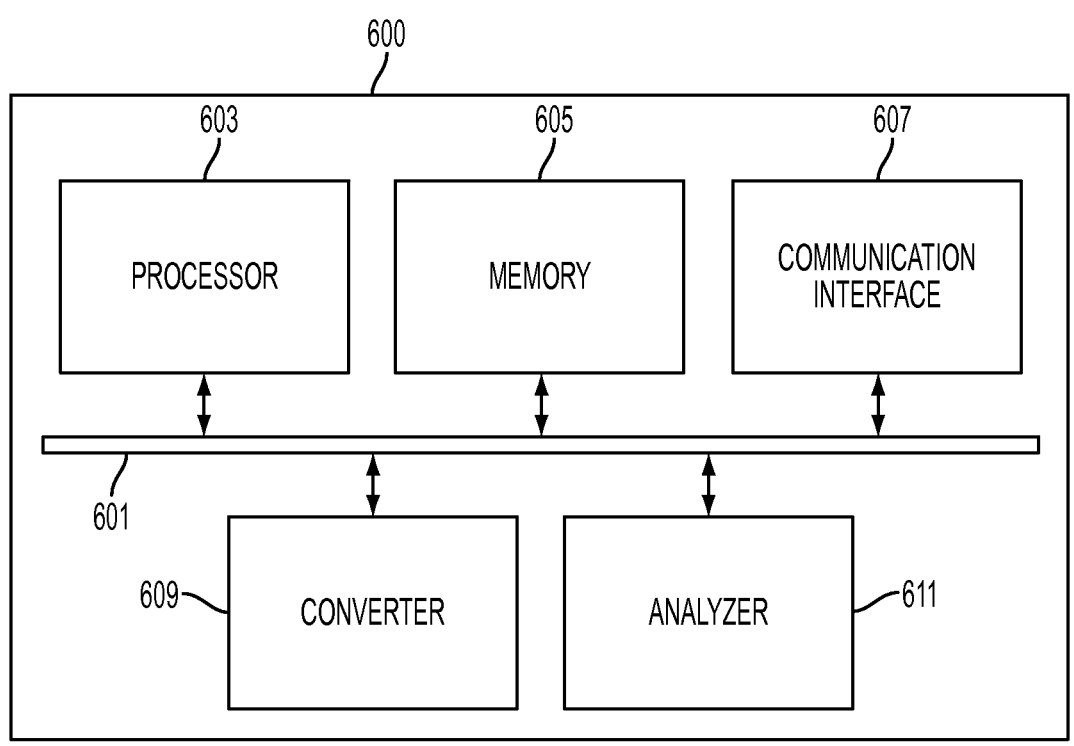
FIG. 6 schematically illustrates a computer system upon which an exemplary embodiment of the invention may be implemented.

FIG. 1 is a flowchart of a process for providing timing-closed FinFET designs from planar designs, in accordance with an exemplary embodiment of the present disclosure. In some aspects, a finification platform may perform the process 100 and may be implemented in, for instance, a computer system including a processor and a memory as shown in FIG. 6. In step 101, the finification platform may receive one or more planar cells associated with a planar design (e.g., a timing-closed planar design). In step 103, the finification platform may generate an initial FinFET design corresponding to the planar design based on the planar cells and a FinFET model. For example, the finification platform may overlap the planar cells associated with the planar design and a fin-based grid associated with the FinFET model, and remove fins of the fin-based grid that do not overlap a diffusion region of the planar cells. Remaining fins of the fin-based grid may then be utilized as active fins for the initial FinFET design.

In step 105, the finification platform may process the initial FinFET design to provide a timing-closed FinFET design. By way of example, the finification platform may utilize a script to determine one or more race conditions associated with paths of the initial FinFET design based on a timing analysis of the initial FinFET design. To resolve hold violations associated with the race conditions, the finification platform may, for instance, increase delay associated with a path having a hold violation (e.g., by replacing a FinFET cell in the path with a corresponding FinFET cell slower than that FinFET cell) to provide the timing-closed FinFET design. In this way, the unique nature of FinFET quantization of transistors is leveraged to realize a robust, low-cost solution that converts a planar design to a FinFET design, for instance, with only a few mask changes. As such, greater power performance associated with FinFET designs may be achieved without significant design and mask costs.

Figure 2:
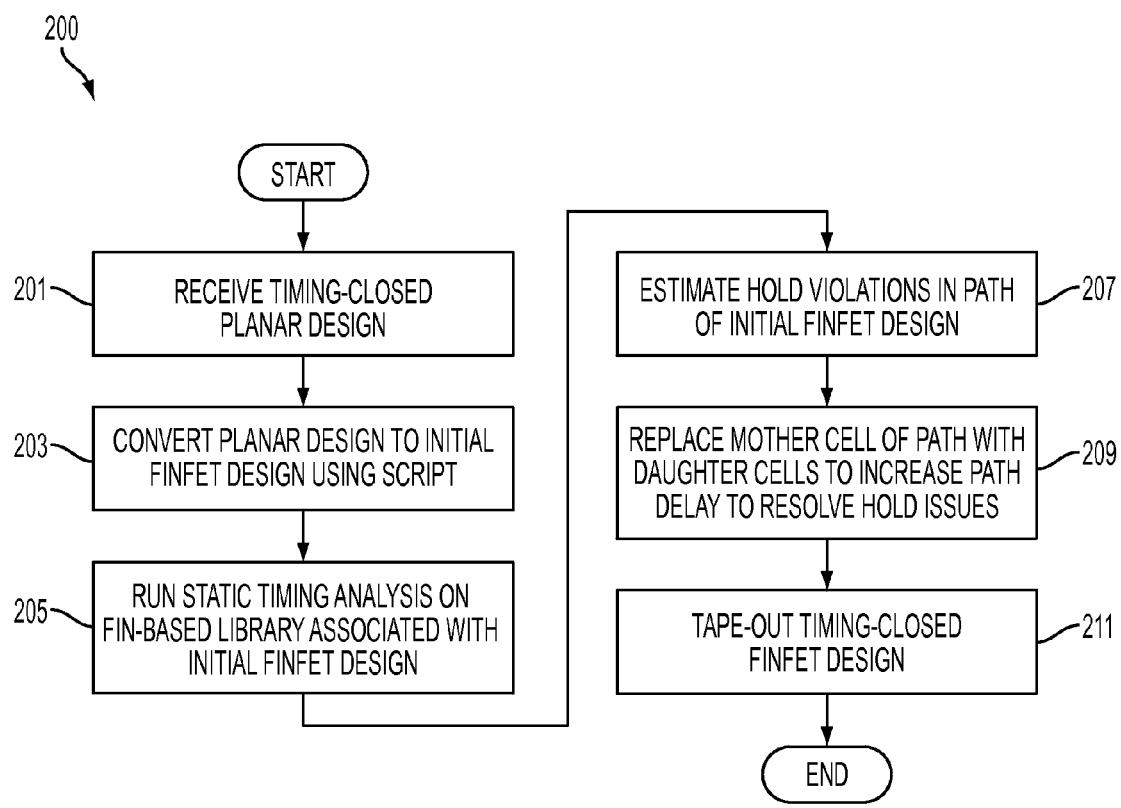
FIG. 2 is another flowchart of a process for providing timing-closed FinFET designs from planar designs, in accordance with an exemplary embodiment of the present disclosure.

FIG. 2 is another flowchart of a process for providing timing-closed FinFET designs from planar designs, in accordance with an exemplary embodiment of the present disclosure. In some aspects, a finification platform may perform the process 200 and may be implemented in, for instance, a computer system including a processor and a memory as shown in FIG. 6. In steps 201 and 203, respectively, the finification platform may receive a timing-closed planar design and convert the planar design to an initial FinFET design (e.g., using a script). As indicated, in certain aspects, a fin-based grid may be utilized to perform the conversion step.

In steps 205 and 207, the finification platform may run a static timing analysis on a fin-based library associated with the initial FinFET design, and thereafter estimate hold violations in one or more paths of the initial FinFET design. In step 209, the finification platform may then replace mother cells of the paths (having hold violations) with slower daughter cells to increase path delay and resolve hold issues. When the hold issues are resolved, the finification platform may, at step 211, tape-out the timing-closed FinFET design.

Figure 3A:
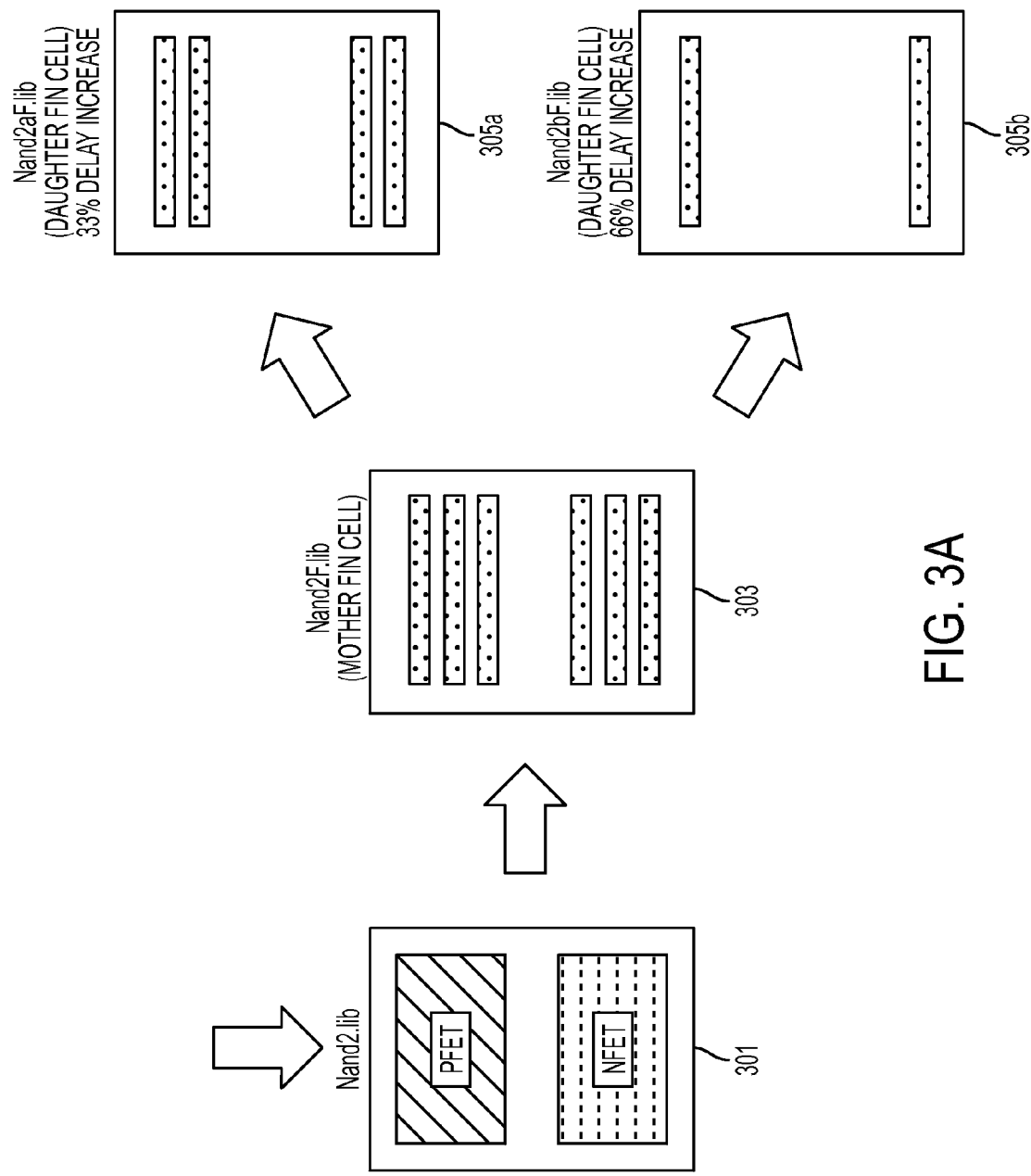
FIG. 3A schematically illustrates generation of mother and daughter FinFET cells from a planar cell, in accordance with an exemplary embodiment of the present disclosure.

FIG. 3A schematically illustrates generation of mother and daughter FinFET cells from a planar cell, in accordance with an exemplary embodiment of the present disclosure. As shown, planar cell 301 (e.g., from a planar design) may be received and converted into FinFET cell 303 (e.g., mother fin cell). FinFET cells 305a and 305b (e.g., daughter fin cells) may then be generated from FinFET cell 303. As illustrated, FinFET cells 305a and 305b have fewer fins than FinFET cell 303. In addition, the number of fins vary in each of the FinFET cells 305a and 305b based on the delay increase corresponding to the respective FinFET cells 305a and 305b (e.g., 33% delay increase, 66% delay increase, etc.).

Figure 3B:
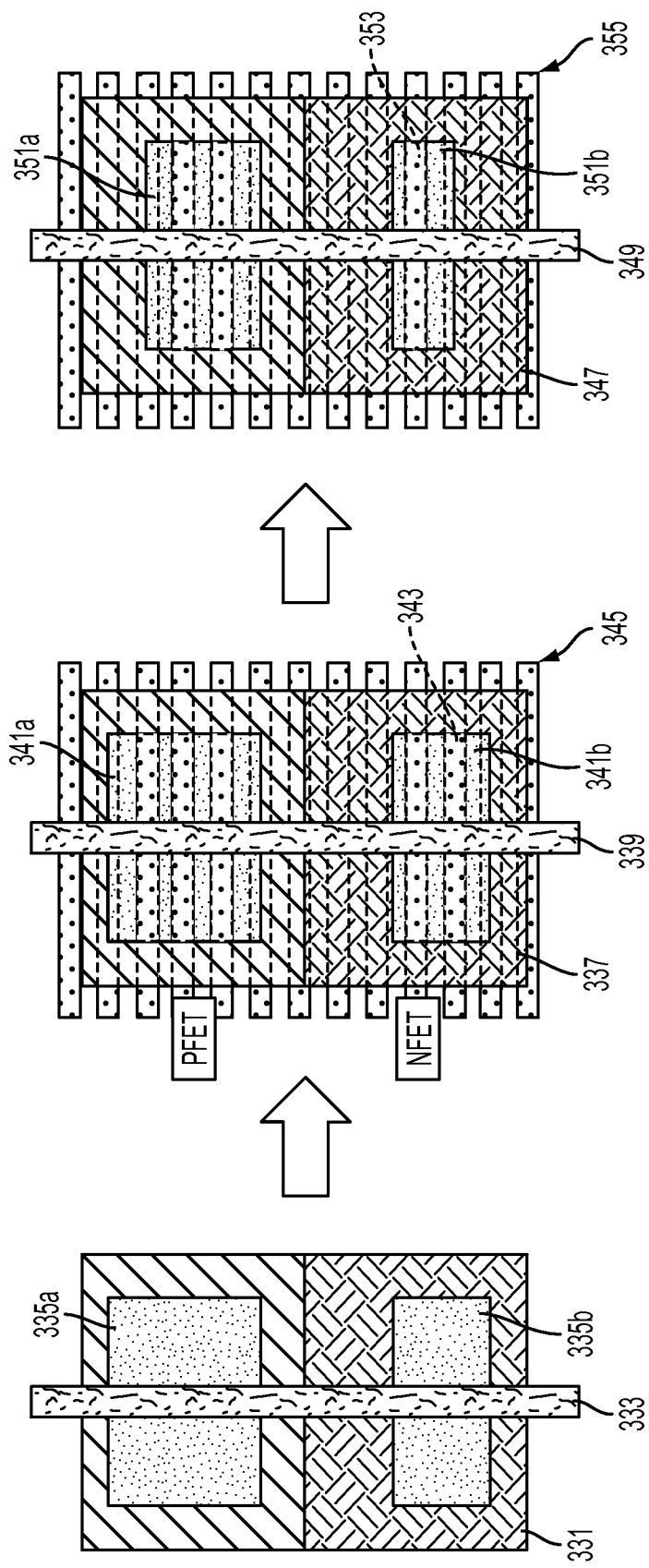
FIG. 3B schematically illustrates generation of mother and daughter FinFET cells from a planar cell using a fin-based grid, in accordance with an exemplary embodiment of the present disclosure.

FIG. 3B schematically illustrates generation of mother and daughter FinFET cells from a planar cell using a fin-based grid, in accordance with an exemplary embodiment of the present disclosure. By way of example, planar cell 331 associated with a planar design may be received. As shown, planar cell 331 may include gate structure 333 along with diffusion regions 335a and 335b. FinFET cell 337 (e.g., mother cell) may include gate structure 339, diffusion regions 341a and 341b, and active fins 343, and may be generated based on planar cell 331. Fin-based grid 345 and a planar-based cell derived from planar cell 331 may, for instance, be overlapped, and fins that do not fall within at least one of the diffusion regions 341a and 341b may be removed (e.g., a fin is dropped if both height and width portions of the fin are only partially within at least one of the diffusion regions 341a and 341b). Remaining fins of the fin-based grid 345 may then utilized as active fins 343 of the FinFET cell 337.

As indicated, daughter cells may be generated based on the mother cell. FinFET cell 347 (e.g., daughter cell) may, for instance, be generated based on FinFET cell 337. As illustrated, FinFET cell 347 may include gate structure 349, diffusion regions 351a and 351b, and active fins 353. As an example, diffusion regions 351a and 351b of FinFET cell 347 may be a result of reducing their respective heights by one-fin pitch from the respective heights of diffusion regions 341a and 341b of FinFET cell 337. Fin-based grid 355 and the resulting cell may be overlapped, and fins that do not fall within at least one of the diffusion regions 351a and 351b may be removed. Remaining fins of the fin-based grid 355 may then utilized as active fins 353 of the FinFET cell 347. In certain aspects, other daughter cells may be generated by continuing to reduce the heights of the diffusion regions by one-fin pitch until the number of active fins in at least one of the diffusion regions is zero. As such, a plurality of daughter cells with varying number of fins may be generated based on the mother cell to enable a simple, low-cost resolution to providing FinFET designs (e.g., through finification of planar designs).

Figure 4:
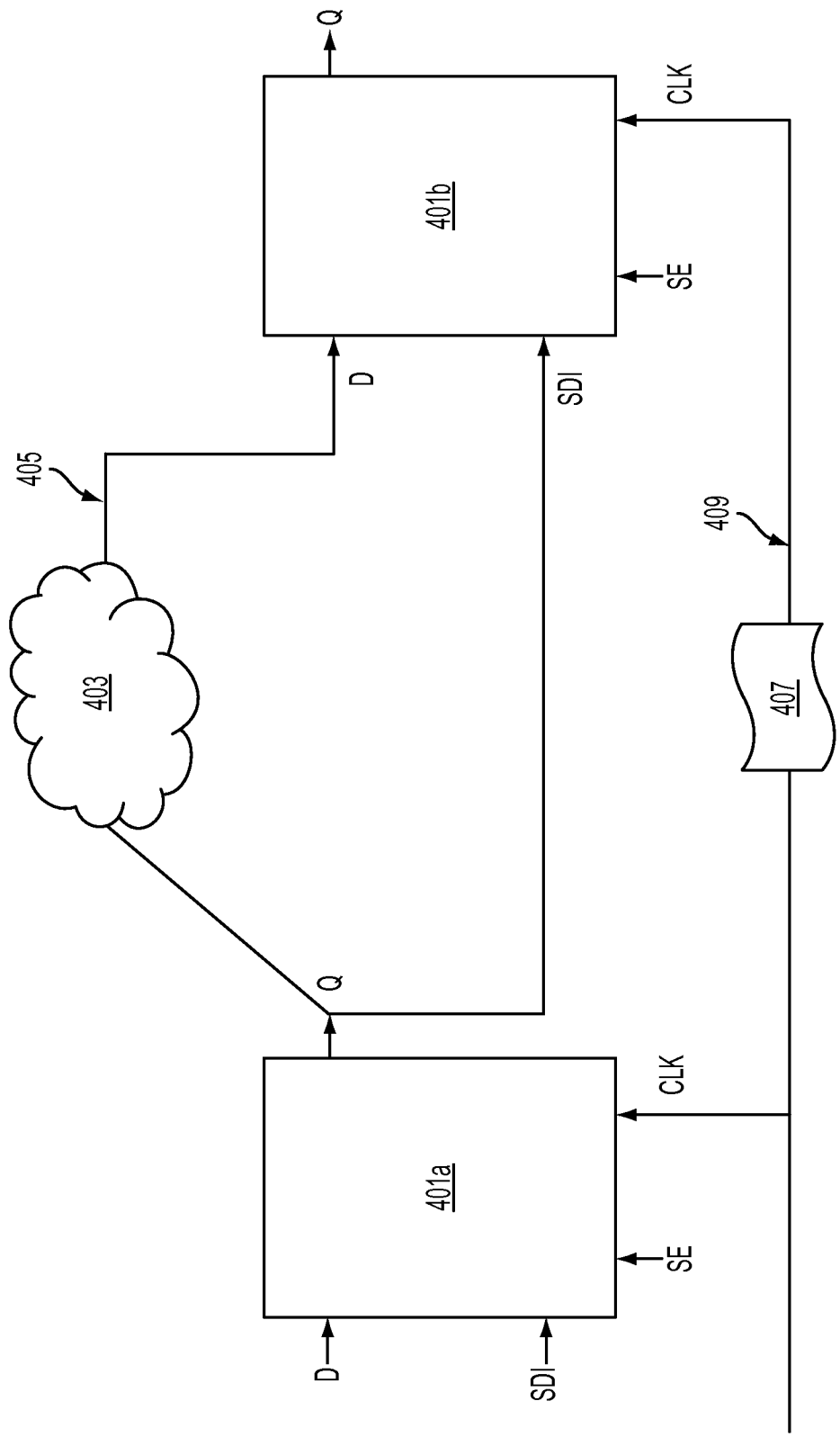
FIG. 4 schematically illustrates a resolution for race conditions, hold violations, etc., in accordance with an exemplary embodiment of the present disclosure.

FIG. 4 schematically illustrates a resolution for race conditions, hold violations, etc., in accordance with an exemplary embodiment of the present disclosure. As shown, a circuit may include one or more D flip-flops 401 (e.g., flip-flop 401a and 401b), data logic 403 along data path 405, and clock logic 407 along clock path 409. If, for instance, there are race conditions associated with one or more paths of the initial FinFET design after conversion from the planar design, delay associated with a path may be increased to resolve such issues (e.g., race condition in data path 405 due to unbalanced clock path 409). By way of example, data logic 403 may be adjusted by replacing mother cells with daughter cells, and clock logic 407 may be balanced by optimizing buffers (e.g., daughter buffer cells), to provide a timing-closed FinFET design.

Figure 5:
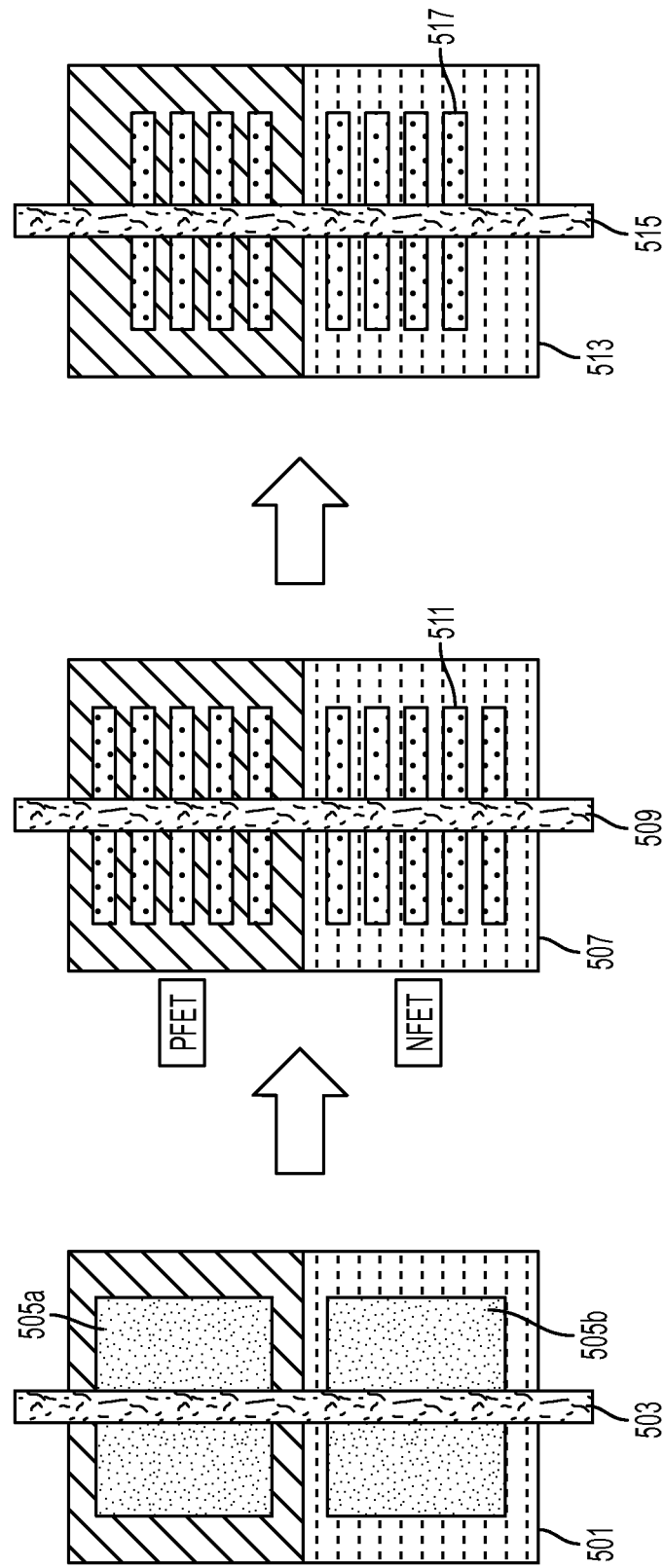
FIG. 5 schematically illustrates analog trimming to provide timing-closed FinFET designs, in accordance with an exemplary embodiment of the present disclosure.

FIG. 5 schematically illustrates analog trimming to provide timing-closed FinFET designs, in accordance with an exemplary embodiment of the present disclosure. As shown, planar cell 501 (e.g., that includes gate structure 503 along with diffusion regions 505a and 505b) may be received and converted into FinFET cell 507. FinFET cell 507 may include gate structure 509 along with active fins 511 (e.g., in their respective diffusion regions). If, for instance, a delay increase is needed in a path associated with FinFET cell 507 (e.g., due to hold violation issues), at least one of the fins in each of the diffusion regions of FinFET cell 507 may be removed, resulting in FinFET cell 513 (e.g., that includes gate structure 515 and active fins 517). As illustrated, FinFET cell 513 has fewer active fins than FinFET cell 507, and, thus, may resolve the previous hold violation issues (e.g., due to delay increase associated with the fewer active fins) to provide a timing-closed FinFET design.

FIG. 6 schematically illustrates a computer system 600 upon which an exemplary embodiment of the invention may be implemented. Computer system 600 may, for instance, be programmed (e.g., via computer program code or instructions) to provide timing-closed FinFET designs from planar designs as described herein and may include a communication mechanism such as a bus 601 for passing information between other internal and external components of the computer system 600. Moreover, computer system 600 may include a processor (or multiple processors) 603 for performing a set of operations on information as specified by computer program code related to providing timing-closed FinFET designs from planar designs. Computer system 600 may also include memory 605 coupled to bus 601. The memory 605 may, for instance, include dynamic storage, static storage, or a combination thereof for storing information including processor instructions for providing timing-closed FinFET designs from planar designs.

By way of example, based on computer program code in memory 605, processor 603 may interact with communication interface 607 to receive one or more planar cells associated with a planar design. Processor 603 may then work with converter 609 to generate an initial FinFET design corresponding to the planar design based on the planar cells and a FinFET model. As indicated, in some aspects, converter 609 may generate the initial FinFET design by overlapping a fin-based grid and the planar cells, and removing fins of the fin-based grid that do not overlap a diffusion region of the planar cells. Converter 609 may then provide the remaining fins of the fin-based grid as active fins for the initial FinFET design.

Processor 603 may thereafter direct analyzer 611 to process the initial FinFET design to provide a timing-closed FinFET design. Analyzer 611 may, for instance, perform a static timing analysis to determine race conditions, hold violations, etc., associated with the initial FinFET design, and to determine the necessary delay increase for one or more paths associated with the race conditions, hold violations, etc., in order to provide the timing-closed FinFET design. As discussed, in certain aspects, delay increase may be implemented for a path by replacing a FinFET cell of the path with a corresponding FinFET cell slower than the FinFET cell, removing a fin of the FinFET cell of the path, or a combination thereof.

It is noted that, in various aspects, some or all of the techniques described herein are performed by computer system 600 in response to processor 603 executing one or more sequences of one or more processor instructions contained in memory 605. Such instructions, also called computer instructions, software and program code, may be read into memory 605 from another computer-readable medium such as a storage device or a network link. Execution of the sequences of instructions contained in memory 605 causes processor 603 to perform one or more of the method steps described herein. In alternative embodiments, hardware, such as application-specific integrated circuits (ASICs), may be used in place of or in combination with software to implement the invention. Thus, embodiments of the invention are not limited to any specific combination of hardware and software, unless otherwise explicitly stated herein.

The embodiments of the present disclosure can achieve several technical effects, including increased layout integrity and reduced patterning costs. Embodiments of the present disclosure enjoy utility in various industrial applications as, for example, microprocessors, smart phones, mobile phones, cellular handsets, set-top boxes, DVD recorders and players, automotive navigation, printers and peripherals, networking and telecom equipment, gaming systems, and digital cameras. The present disclosure therefore enjoys industrial applicability in any of various types of highly integrated semiconductor devices.

In the preceding description, the present disclosure is described with reference to specifically exemplary embodiments thereof. It will, however, be evident that various modifications and changes may be made thereto without departing from the broader spirit and scope of the present disclosure, as set forth in the claims. The specification and drawings are, accordingly, to be regarded as illustrative and not as restrictive. It is understood that the present disclosure is capable of using various other combinations and embodiments and is capable of any changes or modifications within the scope of the inventive concept as expressed herein.

What is claimed is:

1. A method comprising:
   receiving one or more planar cells associated with a planar design;
   generating, by a processor, an initial FinFET design corresponding to the planar design based on the planar cells and a FinFET model; and
   replacing a FinFET cell in a path of the initial FinFET design with a corresponding FinFET cell with fewer fins than the FinFET cell to provide a timing-closed FinFET design,
   wherein the FinFET cell is a mother cell and the corresponding FinFET cell is a daughter cell of the mother cell.

2. The method according to claim 1, further comprising:
   determining a race condition associated with the path of the initial FinFET design based on a timing analysis of the initial FinFET design; and
   increasing delay associated with the path to resolve hold violations associated with the race condition by replacing the FinFET cell with the corresponding FinFET cell.

3. The method according to claim 2, wherein the path is a clock path, a data path, or a combination thereof.

4. The method according to claim 1, further comprising:
   generating the mother cell, the daughter cell, or a combination thereof based on the planar cells and the FinFET model.

5. The method according to claim 4, further comprising:
   generating the daughter cell based on a high frequency of use associated with the mother cell.

6. The method according to claim 1, further comprising:
   generating a plurality of daughter cells corresponding to the mother cell, wherein each of the plurality of daughter cells is associated with a different number of fins, and the daughter cell is selected from the plurality of daughter cells.

7. The method according to claim 1, further comprising:
   generating a fin-based grid associated with the FinFET model;
   overlapping the fin-based grid and the planar cells; and
   removing fins of the fin-based grid that do not overlap a diffusion region of the planar cells, wherein the generation of the initial FinFET design is based on the removal of the fins.

8. The method according to claim 7, further comprising:
   providing remaining fins of the fin-based grid as active fins for the initial FinFET design, wherein the generation of the initial FinFET design is further based on the remaining fins.

9. The method according to claim 7, further comprising:
   removing additional fins of the fin-based grid that partially overlap a diffusion region of the planar cells, wherein the generation of the initial FinFET design is based on the removal of the additional fins.

10. The method according to claim 1, wherein the planar design is a timing-closed planar design.

11. An apparatus comprising:
    a processor; and
    a memory including computer program code for one or more programs,
    the memory and the computer program code configured to, with the processor, cause the apparatus to perform at least the following:
    receive one or more planar cells associated with a planar design;
    generate an initial FinFET design corresponding to the planar design based on the planar cells and a FinFET model; and
    replace a FinFET cell in a path of the initial FinFET design with a corresponding FinFET cell with fewer fins than the FinFET cell to provide a timing-closed FinFET design,
    wherein the FinFET cell is a mother cell and the corresponding FinFET cell is a daughter cell of the mother cell.

12. The apparatus according to claim 11, wherein the apparatus is further caused to:
    determine a race condition associated with a path of the initial FinFET design based on a timing analysis of the initial FinFET design; and
    increase delay associated with the path to resolve hold violations associated with the race condition by replacing the FinFET cell in the path with the corresponding FinFET cell slower than the FinFET cell.

13. The apparatus according to claim 12, wherein the apparatus is further caused to:
    generate the mother cell based on the planar cells and the FinFET model; and
    generate the daughter cell based on the planar cells, the FinFET model, and a high frequency of use associated with the mother cell.

14. The apparatus according to claim 12, wherein the apparatus is further caused to:
    generate a plurality of daughter cells corresponding with the mother cell, wherein each of the plurality of daughter cells is associated with a different number of fins, and the daughter cell is selected from the plurality of daughter cells.

15. The apparatus according to claim 11, wherein the apparatus is further caused to:
    generate a fin-based grid associated with the FinFET model;
    overlap the fin-based grid and the planar cells;

remove fins of the fin-based grid that do not overlap a diffusion region of the planar cells; and provide remaining fins of the fin-based grid as active fins for the initial FinFET design, wherein the generation of the initial FinFET design is further based on the remaining fins.

16. The apparatus according to claim 15, wherein the apparatus is further caused to:

remove additional fins of the fin-based grid that partially overlap a diffusion region of the planar cells, wherein the generation of the initial FinFET design is based on the removal of the additional fins.

17. A method comprising:

receiving one or more planar cells associated with a planar design;

generating, by a processor, an initial FinFET design corresponding to the planar design based on the planar cells and a FinFET model;

determining a race condition associated with a path of the initial FinFET design based on a timing analysis of the initial FinFET design;

increasing delay associated with the path to resolve hold violations associated with the race condition by replacing a FinFET cell in the path with a corresponding FinFET cell slower than the FinFET cell, removing a fin of the FinFET cell in the path, or a combination thereof; and providing a timing-closed FinFET design based on the delay increase, wherein the FinFET cell is a mother cell, the corresponding FinFET cell is a daughter cell of the mother cell, and the daughter cell has fewer fins than the mother cell.

18. The method according to claim 17, further comprising:

generating a plurality of daughter cells corresponding with the mother cell based on a high frequency of use associated with the mother cell, wherein each of the plurality of daughter cells is associated with a different number of fins, and the daughter cell is selected from the plurality of daughter cells.

19. The method according to claim 17, further comprising:

generating a fin-based grid associated with the FinFET model;

overlapping the fin-based grid and the planar cells;

removing fins of the fin-based grid that do not overlap a diffusion region of the planar cells; and providing remaining fins of the fin-based grid as active fins for the initial FinFET design, wherein the generation of the initial FinFET design is further based on the remaining fins.

* * * * *